United States Patent
Qi et al.

(10) Patent No.: US 10,909,018 B2
(45) Date of Patent: Feb. 2, 2021

(54) SYSTEM AND METHOD FOR END-TO-END APPLICATION ROOT CAUSE RECOMMENDATION

(71) Applicant: INTERNATIONAL BUSINESS MACHINES CORPORATION, Armonk, NY (US)

(72) Inventors: Yao Dong Qi, Beijing (CN); Lan Jun Wang, Beijing (CN); Hai Shan Wu, Beijing (CN); Di Dx Xu, Beijing (CN); Yi Bj Yang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 481 days.

(21) Appl. No.: 14/845,729

(22) Filed: Sep. 4, 2015

(65) Prior Publication Data
US 2017/0068747 A1    Mar. 9, 2017

(51) Int. Cl.
*G06F 11/34* (2006.01)
*G06F 11/30* (2006.01)

(52) U.S. Cl.
CPC ...... *G06F 11/3452* (2013.01); *G06F 11/3006* (2013.01); *G06F 2201/87* (2013.01)

(58) Field of Classification Search
CPC .............. G06F 11/079; G06F 11/0709; G06F 11/3409; G06F 11/3466; G06F 2201/87
(Continued)

(56) References Cited

U.S. PATENT DOCUMENTS

| | | |
|---|---|---|
| 6,363,477 B1 | 3/2002 | Fletcher et al. |
| 6,442,615 B1 | 8/2002 | Nordenstam et al. |

(Continued)

FOREIGN PATENT DOCUMENTS

| | | |
|---|---|---|
| WO | 2012092256 | 7/2012 |
| WO | 2014088559 | 6/2014 |

OTHER PUBLICATIONS

Kim et al. "Root Cause Detection in a Service-Oriented Architecture" SIMETRICS' 13, Jun. 17-21, 2013 Pittsburgh, PA USA ACM.*

(Continued)

*Primary Examiner* — Taelor Kim
*Assistant Examiner* — Berhanu Mitiku
(74) *Attorney, Agent, or Firm* — F. Chau & Associates, LLC

(57) ABSTRACT

A method of identifying a root cause in a distributed computing environment is provided including collecting metric data of a plurality of application components, collecting metric correlation relationship data, collecting topology relationship data, and collecting transaction tracking relationship data that indicates a group of the application components used to execute a requested transaction. A graph is generated including a plurality of nodes corresponding to the application components by merging the metric correlation relationship data, the topology relationship data, and the transaction tracking relationship data. The nodes of the graph are traversed in an order based on a bi-directional weight for each of a plurality of edges connecting neighboring nodes among the plurality of nodes. A recommendation list is generated including at least one abnormal application component. The recommendation includes an instruction to repair the abnormal application component (Continued)

acting as a system bottleneck in the distributed computing environment.

15 Claims, 14 Drawing Sheets

(58) Field of Classification Search
USPC .............. 709/224, 318, 328; 717/124, 126, 717/130–131
See application file for complete search history.

(56) References Cited

U.S. PATENT DOCUMENTS

| | | |
|---|---|---|
| 6,707,795 B1 | 3/2004 | Noorhosseini et al. |
| 7,206,972 B2 | 4/2007 | Wilson et al. |
| 7,239,677 B2 | 7/2007 | Jonsson et al. |
| 7,506,195 B2 | 3/2009 | Takahashi et al. |
| 7,580,998 B2 | 8/2009 | Scarth |
| 7,593,936 B2 | 9/2009 | Hooks |
| 7,818,418 B2 | 10/2010 | Bansal et al. |
| 7,940,716 B2 | 5/2011 | Twitchell, Jr. |
| 8,001,527 B1 | 8/2011 | Qureshi et al. |
| 8,023,867 B2 | 9/2011 | Takano et al. |
| 8,032,867 B2 | 10/2011 | Bansal |
| 8,225,291 B2 | 7/2012 | Chung et al. |
| 8,375,370 B2 | 2/2013 | Chaar et al. |
| 8,423,827 B2 | 4/2013 | Berriss et al. |
| 8,463,899 B2 | 6/2013 | Scarpelli et al. |
| 8,553,561 B1 | 10/2013 | Chokshi et al. |
| 8,751,867 B2 | 6/2014 | Marvasti et al. |
| 9,065,743 B2 | 6/2015 | Bakshi et al. |
| 9,160,609 B2 | 10/2015 | Dunbar et al. |
| 9,160,628 B2 | 10/2015 | Field et al. |
| 9,418,088 B1 | 8/2016 | Noll |
| 9,882,782 B2 | 1/2018 | Finkler et al. |
| 9,954,765 B2 | 4/2018 | Allan |
| 2001/0052016 A1 | 12/2001 | Skene et al. |
| 2002/0111755 A1 | 8/2002 | Valadarsky et al. |
| 2003/0046390 A1 | 3/2003 | Ball et al. |
| 2004/0073844 A1 | 4/2004 | Unkle et al. |
| 2004/0218698 A1 | 11/2004 | Jonsson et al. |
| 2005/0144314 A1 | 6/2005 | Kan et al. |
| 2005/0206513 A1 | 9/2005 | Fallon |
| 2006/0007863 A1 | 1/2006 | Naghian |
| 2008/0037562 A1 | 2/2008 | Saleh et al. |
| 2008/0114581 A1 | 5/2008 | Meir et al. |
| 2008/0222068 A1* | 9/2008 | Bahl ................... G06N 5/043 706/46 |
| 2008/0279101 A1 | 11/2008 | Wu et al. |
| 2009/0018983 A1* | 1/2009 | El-Rafei ............... G06F 21/50 706/12 |
| 2009/0086741 A1 | 4/2009 | Zhang et al. |
| 2010/0138694 A1 | 6/2010 | Harrison et al. |
| 2010/0306305 A1 | 12/2010 | Dehaan |
| 2011/0047262 A1 | 2/2011 | Martin et al. |
| 2012/0086855 A1* | 4/2012 | Xu ...................... G06T 13/205 348/515 |
| 2012/0158933 A1 | 6/2012 | Shetty et al. |
| 2012/0185735 A1 | 7/2012 | Sambamurthy et al. |
| 2012/0300774 A1 | 11/2012 | Casey et al. |
| 2012/0331551 A1 | 12/2012 | Van Steenbergen et al. |
| 2013/0097463 A1* | 4/2013 | Marvasti ............. G06F 11/079 714/47.1 |
| 2013/0117748 A1 | 5/2013 | Cooper et al. |
| 2013/0212440 A1 | 8/2013 | Rom et al. |
| 2015/0188783 A1 | 7/2015 | Shivashankar et al. |
| 2016/0036725 A1 | 2/2016 | Syed et al. |
| 2016/0149771 A1 | 5/2016 | Prasad et al. |
| 2016/0162346 A1 | 6/2016 | Kushnir et al. |
| 2016/0180093 A1 | 6/2016 | Goss et al. |
| 2016/0224400 A1 | 8/2016 | Shafique et al. |
| 2017/0075744 A1 | 3/2017 | Deshpande et al. |
| 2017/0093645 A1 | 3/2017 | Zhong et al. |
| 2017/0155570 A1 | 6/2017 | Maheshwari et al. |
| 2017/0161131 A1 | 6/2017 | Noll |
| 2017/0284839 A1 | 10/2017 | Ojala |
| 2018/0197327 A1 | 7/2018 | Sun et al. |

OTHER PUBLICATIONS

Kim et al. "Root Cause Detection in a Service-Oriented Architecture" SIMETRICS' 13, Jun. 17-21, 2013 Pittsburgh, PA USA.*
Mazda A. Marvasti, et al., "An Anomaly Event Correlation Engine: Identifying Root Causes, Bottlenecks, and Black Swans in it Environements", VMware Technical Journal, 2013, pp. 1-34.
Myunghwan Kim et al., "Root Cause Detection in a Service-Oriented Architecture", SIGMETRICS' 13, Jun. 17-21, Pittsburgh, PA, USA.
Office Action dated Oct. 5. 2017, in U.S. Appl. No. 14/845,667.
Notice of Allowance dated Jan. 28, 2019 in co-related U.S. Appl. No. 14/845,667.
Office Action dated Jun. 28, 2018 in co-related U.S. Appl. No. 14/845,667 (19 pages).
Office Action dated Mar. 22, 2018 in co-related U.S. Appl. No. 14/845,667.

* cited by examiner

SYSTEM AND METHOD FOR END-TO-END APPLICATION ROOT CAUSE RECOMMENDATION

BACKGROUND

Exemplary embodiments of the present invention relate to root cause recommendation. More particularly, exemplary embodiments of the present invention relate to a system and method for relationship based root cause recommendation.

Computer systems, such as cloud applications, may include a distributed computing environment. Cloud applications may include a distributed dynamic environment with linked computers and servers existing in a number of geographic locations. Application problems or errors may occur at any number of the linked computers and servers. Thus, monitoring cloud applications for desired functioning may include identifying one or more root causes of problems or errors. For example, a single server in a particular geographic location may have a problem or error which may impact other servers linked to the server having the problem or error. However, in a large-scale distributed dynamic environment, a relatively large number of errors or problems may be detected. Thus, it may be difficult to identify a particular server that is demonstrating abnormal behavior and it may be difficult to prioritize individual servers or computers for maintenance or repair. Generally, identifying the root cause of a problem in a large-scale distributed dynamic environment will reduce the time elapsed between an occurrence of a problem or error and the resolution of the problem or error.

SUMMARY

Exemplary embodiments of the present invention provide a method of identifying a root cause in a distributed computing environment including collecting metric data generated by each of a plurality of application components, collecting metric correlation relationship data that indicates a relationship between the metric data generated by the application components, collecting topology relationship data that indicates a spatial relationship between the application components, and collecting transaction tracking relationship data that indicates a group of the application components used to execute a requested transaction. A graph is generated including a plurality of nodes corresponding to the application components by merging the metric correlation relationship data, the topology relationship data, and the transaction tracking relationship data. Target nodes are identified among the plurality of nodes that correspond to application components having a response time that is above a predefined threshold. A plurality of paths along the graph that include the target nodes are traversed to identify at least one node corresponding to an abnormal application component. A recommendation list is generated including the at least one abnormal application component.

According to an exemplary embodiment of the present invention the at least one node corresponding to the abnormal application component may be present in each of the traversed plurality of paths.

According to an exemplary embodiment of the present invention the metric data may include at least one of a response time, a throughput, a latency, and an error count.

According to an exemplary embodiment of the present invention the application components may be services executed by a plurality of computers in the distributed computing environment.

According to an exemplary embodiment of the present invention the topology relationship data may further indicate a traversed path along the group of the application components taken to execute the requested transaction.

According to an exemplary embodiment of the present invention the group of the application components used to execute the requested transaction may include some of the application components.

According to an exemplary embodiment of the present invention the group of the application components used to execute the requested transaction may include all of the application components.

According to an exemplary embodiment of the present invention the at least one abnormal application component may function as a system bottleneck.

Exemplary embodiments of the present invention provide a method of identifying a root cause in a distributed computing environment including collecting metric data generated by each of a plurality of application components, collecting metric correlation relationship data that indicates a relationship between the metric data generated by the application components, collecting topology relationship data that indicates a spatial relationship between the application components, and collecting transaction tracking relationship data that indicates a group of the application components used to execute a requested transaction. A graph is generated including a plurality of nodes corresponding to the application components by merging the metric correlation relationship data, the topology relationship data, and the transaction tracking relationship data. Target nodes are identified among the plurality of nodes that correspond to application components having a throughput that is below a predefined threshold. A plurality of paths along the graph that include the target nodes are traversed to identify at least one node corresponding to an abnormal application component. A recommendation list is generated including the at least one abnormal application component.

Exemplary embodiments of the present invention provide a computer system configured to identify a root cause in a distributed computing environment. The system includes a memory storing a computer program, and a processor configured to execute the computer program. The computer program performs the following steps. Collect metric data generated by each of a plurality of application components. Collect metric correlation relationship data that indicates a relationship between the metric data generated by the application components. Collect topology relationship data that indicates a spatial relationship between the application components. Collect transaction tracking relationship data that indicates a group of the application components used to execute a requested transaction. Generate a graph including a plurality of nodes corresponding to the application components by merging the metric correlation relationship data, the topology relationship data, and the transaction tracking relationship data. Identify target nodes from among the plurality of nodes that correspond to application components having a response time that is above a predefined threshold. Traverse a plurality of paths along the graph that include the target nodes to identify at least one node corresponding to an abnormal application component and generate a recommendation including the at least one abnormal application component.

BRIEF DESCRIPTION OF THE DRAWINGS

The above and other features of the present invention will become more apparent by describing in detail exemplary embodiments thereof, with reference to the accompanying drawings, in which.

DETAILED DESCRIPTION

Figure 1:
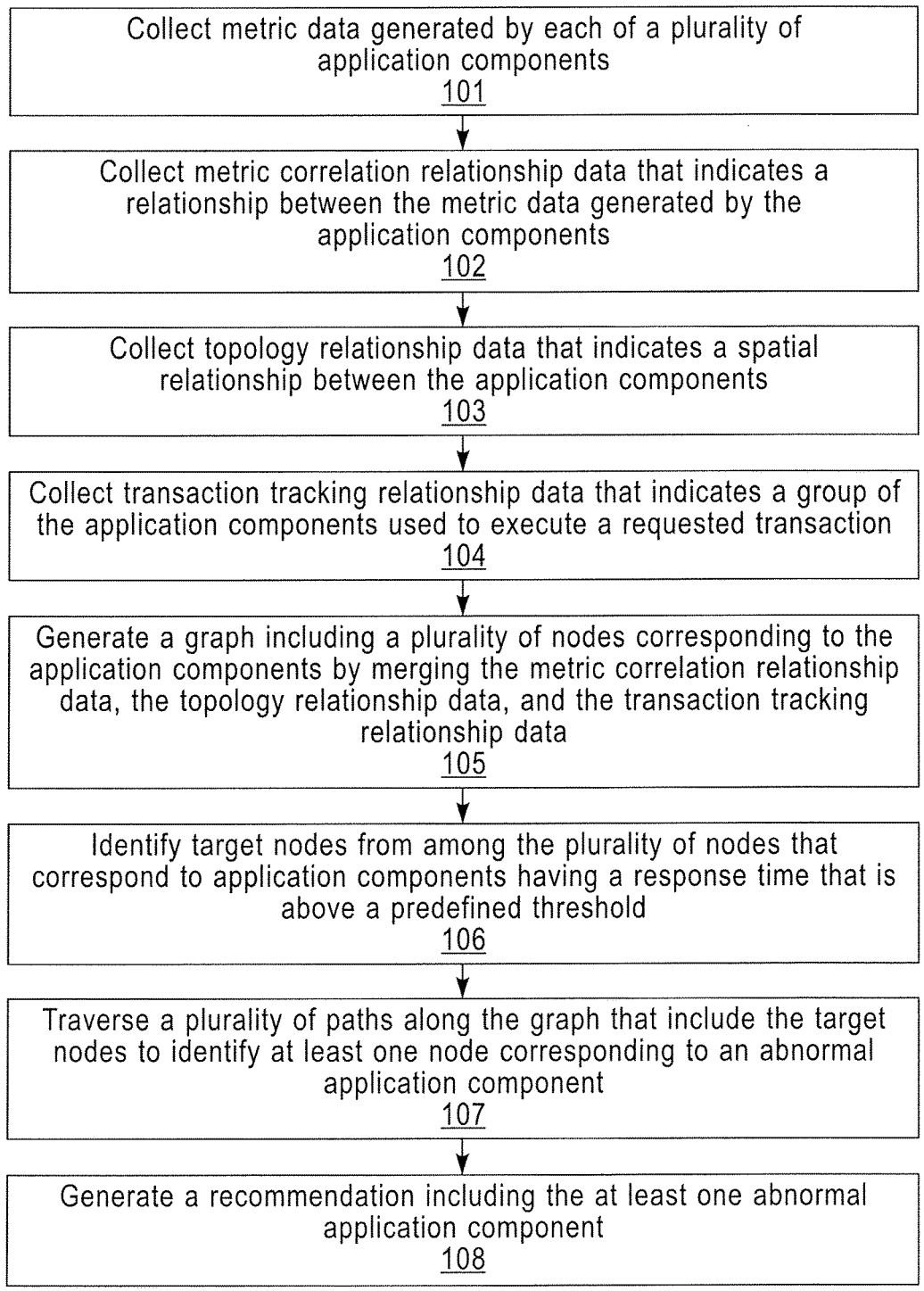
FIG. 1 is a flow chart of a method of relationship based root cause recommendation according to exemplary embodiments of the present invention.

Exemplary embodiments of the present invention described herein generally include identifying a root cause in a distributed computing environment. Accordingly, while the exemplary embodiments of the present invention may be susceptible to various modifications and alternative forms, specific exemplary embodiments are shown by way of example in the drawings and will herein be described in more detail. It should be understood, however, that there is no intent to limit the disclosure to the particular forms disclosed, but on the contrary, the disclosure is to cover all modifications, equivalents, and alternatives falling within the spirit and scope of the present invention.

Exemplary embodiments of the present invention will be described more fully hereinafter with reference to the accompanying drawings. Like reference numerals may refer to like elements throughout the specification and drawings.

FIG. 1 is a flow chart of a method of relationship based root cause recommendation according to exemplary embodiments of the present invention.

Exemplary embodiments of the present invention provide a method of identifying a root cause in a distributed computing environment. Referring to FIG. 1, the method of identifying a root cause in a distributed computing environment may include collecting metric data generated by each of a plurality of application components 101, collecting metric correlation relationship data that indicates a relationship between the metric data generated by the application components 102, collecting topology relationship data that indicates a spatial relationship between the application components 103, and collecting transaction tracking relationship data that indicates a group of the application components used to execute a requested transaction 104. Metric data may include at least one of response time, throughput, latency, and an error count. The terms latency and response time may be used interchangeably herein. The error count may refer to the relative number of times that a communication between connected application components fails or has an error. The metric correlation relationship data, topology relationship data, and transaction tracking relationship data are described in further detail below. A graph (see, e.g., the graphs illustrated in FIG. 6 and FIG. 13) may be generated including a plurality of nodes corresponding to the application components by merging the metric correlation relationship data, the topology relationship data, and the transaction tracking relationship data 105. Target nodes may be identified among the plurality of nodes that correspond to application components having a response time that is above a predefined threshold 106. A plurality of paths along the graph that include the target nodes may be traversed to identify at least one node corresponding to an abnormal application component 107. A recommendation list may be generated including the at least one abnormal application component 108.

The generated graph may include two data sets. A first data set may include a list of each of the edges of the distributed computing environment. A second data set may include a list of each of the servers in the distributed computing environment. Duplicate nodes included in the list of nodes may be removed. Thus, a single node may be used to identify each of the servers in the distributed computing environment. A duplicate node may be a node that shares an identical name with another identified node. That is, the same server may be identified twice and only a single node may be included in the generated graph to represent the single server.

Figure 13:
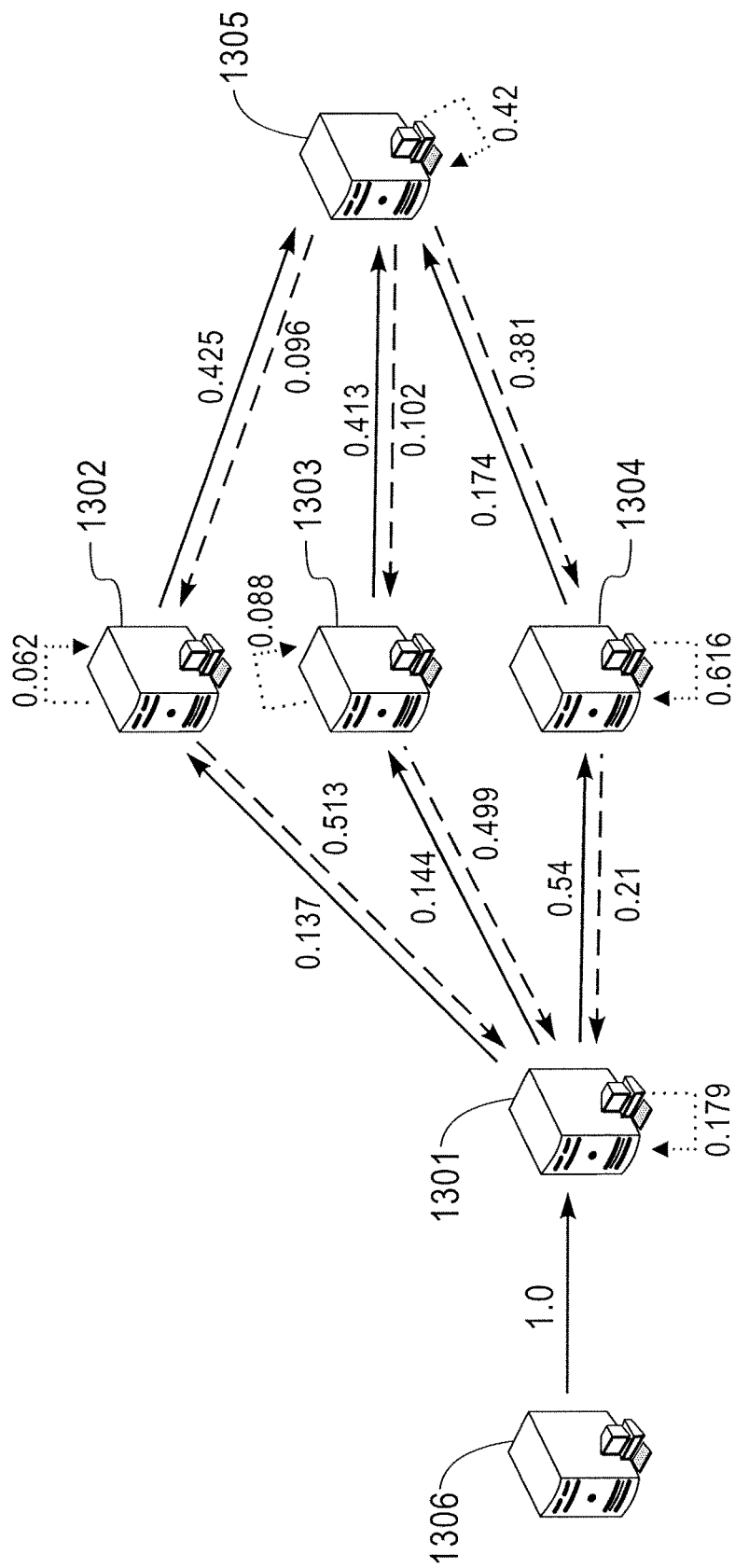
FIG. 13 illustrates exemplary root cause scores for exemplary nodes in a distributed computing environment and exemplary weights for exemplary edges in the distributed computing environment according to an exemplary embodiment of the present invention.

The generated graph may include both outgoing edges (e.g., an outgoing vertex) and incoming edges (e.g., an incoming vertex) between each individual server in the distributed computing environment (see, e.g., FIG. 13). After removing any duplicate nodes, the outgoing and incoming edges may be plotted onto the graph (e.g., the graph illustrated in FIG. 13) with respect to each of the nodes representing each of the identified servers in the distributed computing environment. Thus, graphing of duplicative nodes may be prevented or eliminated and graphing of duplicative edges may be prevented or eliminated. The generated graph may include one node for each server in the distributed computing environment. The generated graph may include topology relationship data for each of the nodes, transaction relationship data for each of the nodes and metric correlation relationship data for each of the nodes, as described below in more detail.

Figure 2:
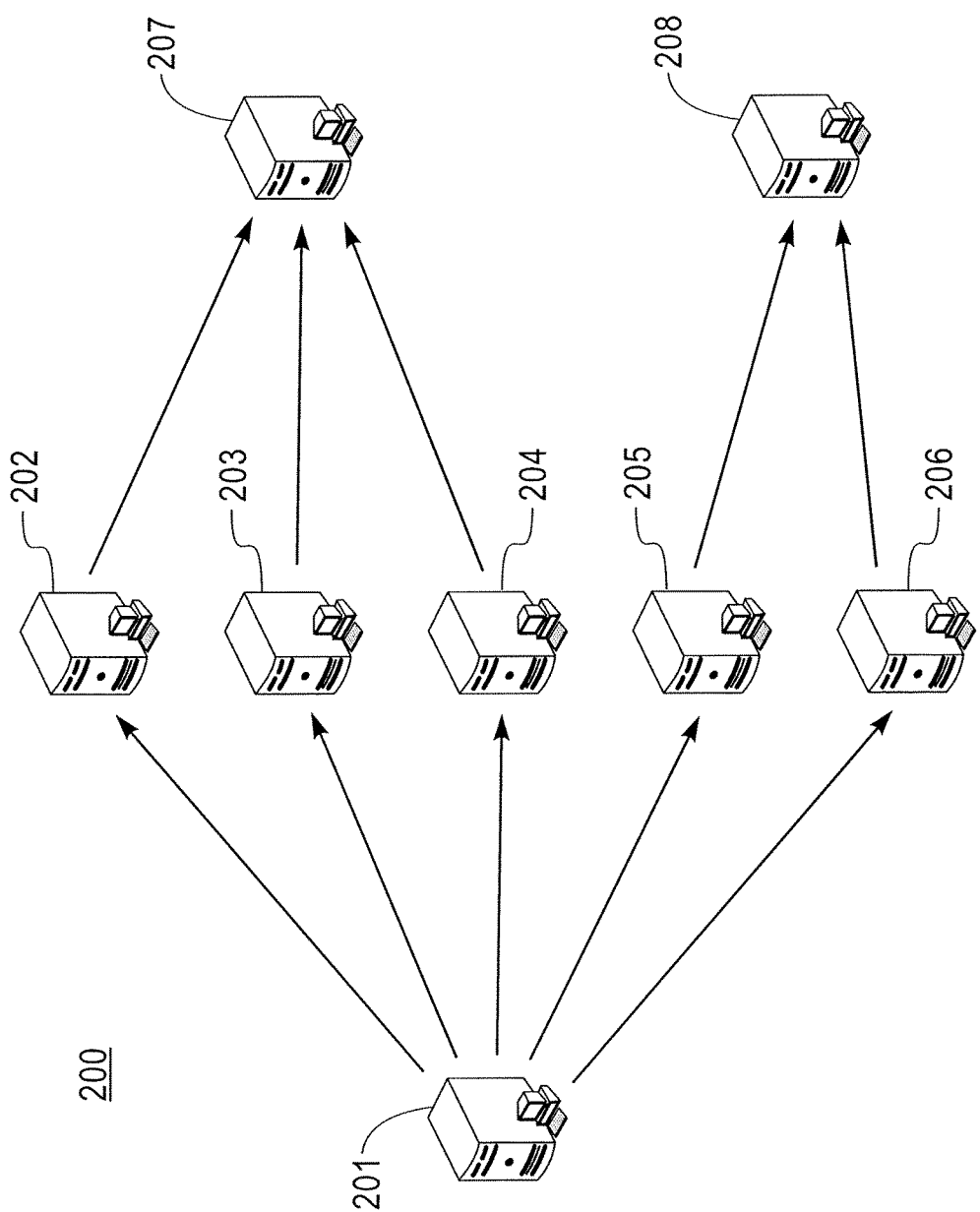
FIG. 2 illustrates a distributed computing environment according to an exemplary embodiment of the present invention.

FIG. 2 illustrates a distributed computing environment according to an exemplary embodiment of the present invention.

Referring to FIG. 2, a distributed computing environment 200 may include a plurality of servers or computers (e.g., servers 201, 202, 203, 204, 205, 206, 207 and 208). The terms server and computer may be used interchangeably herein. Each server or computer in the distributed computing environment may be used to execute an application, such as a cloud application, and thus, each server or computer may be referred to as an application component. Each component of the application may be referred to as a node. For example, as described below in more detail, a graph of the plurality of servers (e.g., servers 201, 202, 203, 204, 205, 206, 207 and 208) may include a plurality of nodes, and each of the plurality of nodes may represent a server.

According to exemplary embodiments of the present invention, each of the plurality of servers (e.g., servers 201, 202, 203, 204, 205, 206, 207 and 208) may be linked with or may communicate with at least one other server. For example, as illustrated in FIG. 2, server 201 may be linked with servers 202, 203, 204, 205 and 206, while servers 202, 203 and 204 are linked with server 207, and servers 205 and 206 are linked with server 208. Communication between each of the servers may be unidirectional or bidirectional, as desired.

Each of the servers (e.g., servers 201, 202, 203, 204, 205, 206, 207 and 208) of the distributed computing environment may be disposed in a different geographic location. For example, each of the servers (e.g., servers 201, 202, 203, 204, 205, 206, 207 and 208) of the distributed computing environment may be disposed in different countries or regions from each other. Distances between each of the servers (e.g., servers 201, 202, 203, 204, 205, 206, 207 and 208) may vary. Alternatively, some or all of the servers (e.g., servers 201, 202, 203, 204, 205, 206, 207 and 208) may be disposed in a same geographic location.

Figure 3:
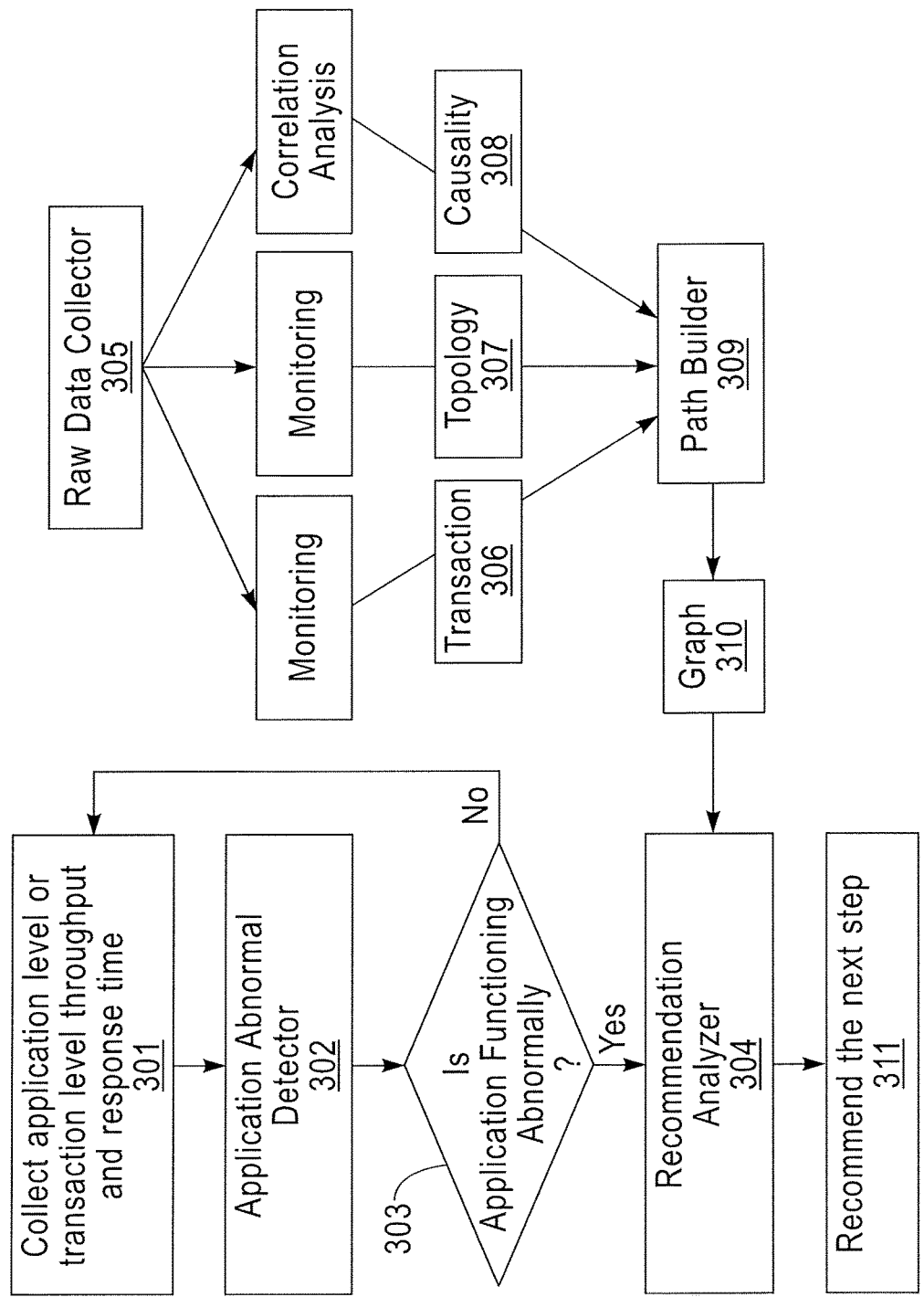
FIG. 3 is a schematic diagram illustrating a method of relationship based root cause recommendation according to exemplary embodiments of the present invention.

FIG. 3 is a schematic diagram illustrating a method of relationship based root cause recommendation according to exemplary embodiments of the present invention.

Referring to FIG. 3, a method of relationship based root cause recommendation according to exemplary embodiments of the present invention may include collecting application level and/or transaction level throughput and response time 301. Application level response time may refer to the elapsed time for a signal to traverse through all application components. Transaction level response time may refer to the elapsed time for a signal to traverse through a predetermined number of application components that are needed to execute a transaction. For example, a user may request a particular service or task from the distributed computing environment, which may be referred to as a transaction. According to an exemplary embodiment of the present invention the application components may be services executed by a plurality of computers in the distributed computing environment. According to an exemplary embodiment of the present invention the group of the application components used to execute the requested transaction may include some of the application components. Alternatively, the group of the application components used to execute the requested transaction may include all of the application components. The transaction may include communication between a predetermined number of servers of the distributed computing environment to deliver the user a response or result. Application level throughput may refer to the amount of data transmitted through the servers in the distributed computing environment. Transaction level throughput may refer to the amount of data transmitted through the servers needed to execute a particular transaction.

The collected application level or transaction level throughput and response time 301 may be evaluated by an application abnormal detector 302. The application abnormal detector 302 may determine if an application is functioning normally. For example, the application abnormal detector 302 may determine whether one or more components of the application are functioning normally or abnormally 303. If the application is found to be functioning normally then a new collection of application level or transaction level throughput and response time 301 may be determined. This process may be repeatedly performed, as desired. For example the process may be performed according to predetermined time intervals or a predetermined number (e.g., 2,500) of processes may be performed to detect application abnormalities, as desired. According to an exemplary embodiment of the present invention the presence of at least one abnormal application component may function as a system bottleneck. If an abnormality is detected, the collected throughput and/or response times may be evaluated by a recommendation analyzer 304, which may recommend a next step 311 to a user.

According to an exemplary embodiment of the present invention, the application abnormal detector 302 may be a threshold abnormality detector. For example, the application abnormal detector 302 may detect an abnormality when a throughput is below a predetermined threshold or when a response time is above a predetermined threshold. If an abnormality is detected, the collected throughput and response times may be evaluated by the recommendation analyzer 304, which may recommend a next step 311 to a user.

The recommendation analyzer 304 may receive a graph 310 from a path builder 309. The path builder 309 may build a graphical representation (e.g., the graph 310) of each of the components of the application. The path builder 309 may receive transaction data 306, topology data 307 and correlation analysis (causality) data 308 from a raw data collector 305 that monitors each of these types of data. The path builder may combine the transaction data 306, the topology data 307 and the correlation analysis (causality) data 308 from the raw data collector 305 to form the graph 310 and may provide the graph to the recommendation analyzer 304. The path builder 309 will be described in more detail below with reference to FIG. 4. The graph generated by the path builder 309 will be described in more detail below with reference to FIGS. 5A, 5B, 5C and 6.

Figure 4:
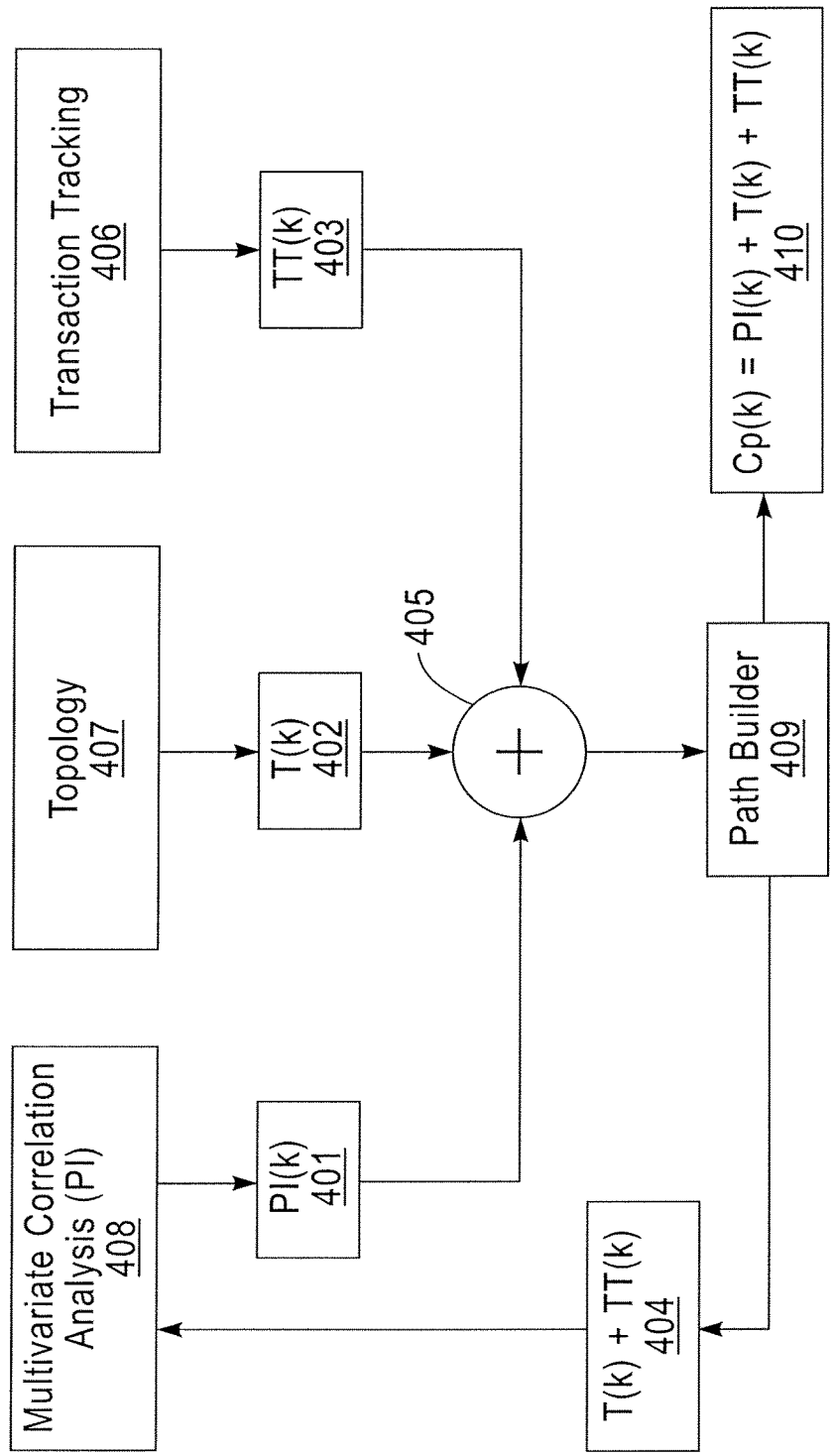
FIG. 4 is a schematic diagram illustrating a path builder according to an exemplary embodiment of the present invention.

FIG. 4 is a schematic diagram illustrating a path builder according to an exemplary embodiment of the present invention.

Figure 6:
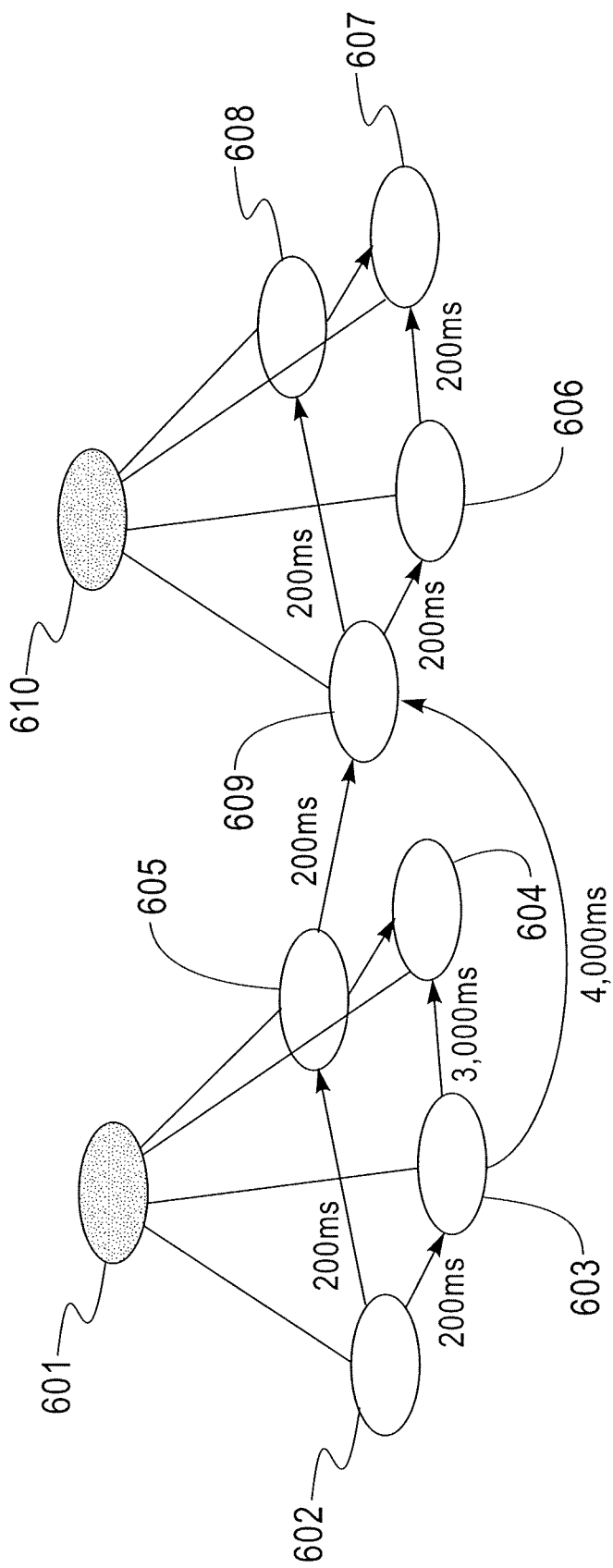
FIG. 6 illustrates an exemplary graph including a plurality of nodes corresponding to application components and node response times according to an exemplary embodiment of the present invention.

Referring to FIG. 4, the path builder 409 may generate a graph based on dependency relationships between the components of the application (see, e.g., FIG. 6 illustrating an exemplary graph including the plurality of nodes representing the plurality of components). The graph generated by the path builder 409 may include topology data and transaction tracking data between the components. That is, the generated graph may be representative of the spatial relationship between individual application components (e.g., based on the topology data), the communications/interconnectivity between individual application components when executing a transaction (e.g., based on the transaction tracking data), and the distances between individual application components (e.g., based on the topology data). As described below in more detail, the generated graph may be traversed at least one time to generate throughput and/or response time data between individual application components. For example, the graph may be repeatedly traversed, as desired. For example, the graph may be repeatedly traversed according to predetermined time intervals, or a predetermined number (e.g., 2,500) of traversals may be performed to detect and/or determine a location of application abnormalities.

The generated graph may include two data sets. A first data set may include a list of each of the edges of the distributed computing environment. A second data set may include a list of each of the servers in the distributed computing environment. Duplicate nodes included in the list of nodes may be removed. Thus, a single node may be used to identify each of the servers in the distributed computing environment. A duplicate node may be a node that shares an identical name with another identified node. That is, the same server may be identified twice and only a single node may be included in the generated graph to represent the single server.

The generated graph may include both outgoing edges (e.g., an outgoing vertex) and incoming edges (e.g., an incoming vertex) between each individual server in the distributed computing environment (see, e.g., FIG. 13). After removing any duplicate nodes, the outgoing and incoming edges may be plotted onto the graph (e.g., the graph illustrated in FIG. 13) with respect to each of the nodes representing each of the identified servers in the distributed computing environment. Thus, graphing of duplicative nodes may be prevented or eliminated and graphing of duplicative edges may be prevented or eliminated. The generated graph may include one node for each server in the distributed computing environment. The generated graph may include topology relationship data for each of the nodes, transaction relationship data for each of the nodes and metric correlation relationship data for each of the nodes, as described below in more detail.

The path builder may receive topology relationship data 407 (T(k) 402), transaction tracking relationship data 406 (TT(k) 403) and metric correlation relationship data 408 (PI(k) 401). The path builder 409 may provide combined topology and transaction tracking data (T(k)+TT(k)) 404 for multivariate correlation analysis 408. The topology relationship data 407 (T(k) 402), the transaction tracking relationship data 406 (TT(k) 403) and the metric correlation relationship data 408 (PI(k) 401) may be combined 405 by the path builder 409 to generate the graph. That is, the generated graph may include the combined topology relationship data 407 (T(k) 402), transaction tracking relationship data 406 (TT(k) 403) and metric correlation relationship data 408 (PI(k) 401), which may be represented by formula Cp(k) =PI(k)+T(k)+TT(k) 410. The topology relationship data 407 (T(k) 402), the transaction tracking relationship data 406 (TT(k) 403) and the metric correlation relationship data 408 (PI(k) 401) will be described in more detail below.

According to an exemplary embodiment of the present invention the transaction tracking relationship data 406 may indicate a traversed path along the group of the application components taken to execute the requested transaction. The topology relationship data 407 may indicate the spatial relationship between application components (e.g., the physical distance between geographic components).

Figure 5A:
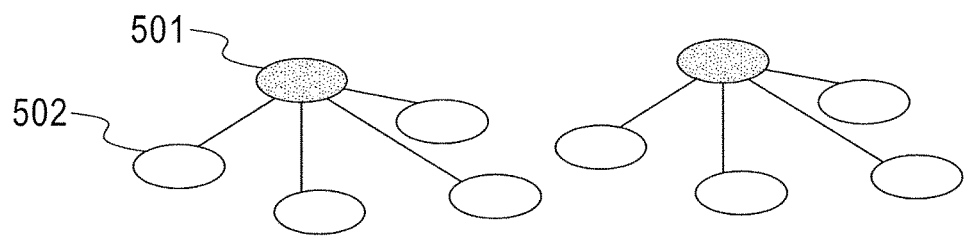
FIG. 5A illustrates topology relationship data according to an exemplary embodiment of the present invention.
Figure 5B:
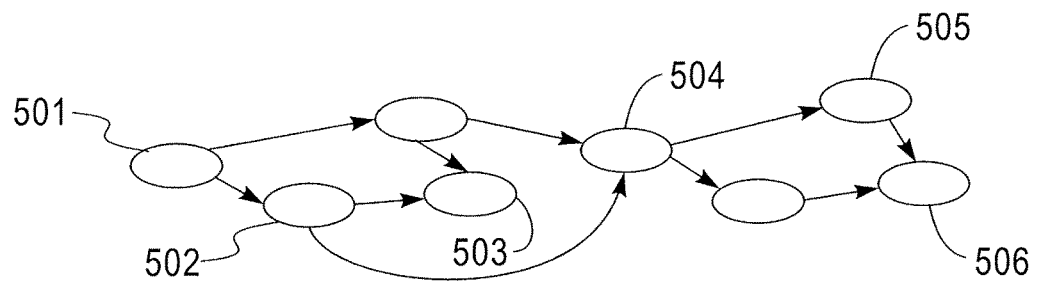
FIG. 5B illustrates transaction tracking relationship data according to an exemplary embodiment of the present invention.
Figure 5C:
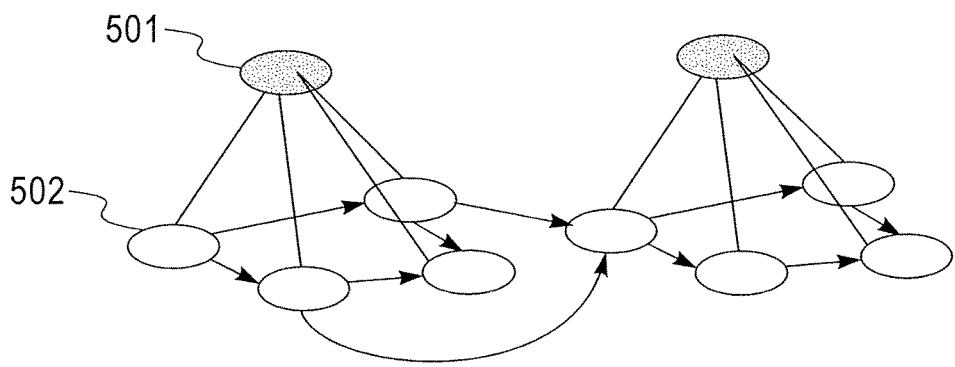
FIG. 5C illustrates metric correlation relationship data according to an exemplary embodiment of the present invention.

FIG. 5A illustrates topology relationship data according to an exemplary embodiment of the present invention. FIG. 5B illustrates transaction tracking relationship data according to an exemplary embodiment of the present invention. FIG. 5C illustrates metric correlation relationship data according to an exemplary embodiment of the present invention.

Referring to FIG. 5A, the topology relationship data may be representative of the spatial relationship between individual application components or nodes. For example, the individual application components may be represented by nodes 501 and 502, as well as the additional nodes shown in FIG. 5A. The topology relationship data may be representative of the relative distances between individual application components (e.g., the distances between application components located at a same and/or at different geographic locations).

Referring to FIG. 5B, the transaction tracking relationship data may be representative of the communications/interconnectivity between individual application components (e.g., nodes 501 through 506, as well as the additional nodes shown in FIG. 5B) that are needed to execute a transaction. When executing a specific transaction, some of the nodes may communicate with each other, while other nodes might not communicate with each other. That is, different transactions may need different groups of nodes to be executed. For example, a first transaction may need communication to occur between nodes 501, 502 and 503, while a second transaction may need communication to occur between nodes 501, 502, 504, 505 and 506.

Referring to FIG. 5C, the topology relationship data and the transaction tracking relationship data may be combined to generate metric correlation relationship data. The combined metric correlation relationship data will be described below in more detail with reference to FIG. 6.

FIG. 6 illustrates an exemplary graph including a plurality of nodes corresponding to application components and node response times according to an exemplary embodiment of the present invention. The graph illustrated in FIG. 6 may be an example of the graph generated by the path builder described above.

Referring to FIG. 6, the graph generated may represent the combined metric correlation relationship data, and the graph may include metric data such as response time between each of the connected nodes corresponding to application components. The graph may be generated including a plurality of nodes corresponding to the application components by merging the metric correlation relationship data, the topology relationship data, and the transaction tracking relationship data. According to exemplary embodiments the metric data may include response time, throughput, latency and/or error count and may be represented on the graph generated by the path builder. For example, the generated graph may include nodes 601, 602, 603, 604, 605, 606, 607, 608, 609, 610 and response times between each of the connected nodes may be included in the graph. Target nodes may be identified among the plurality of nodes that correspond to application components having a response time that is above a predefined threshold. A plurality of paths along the graph that include the target nodes may be traversed to identify at least one node corresponding to an abnormal application component. A recommendation list may be generated including the at least one abnormal application component. According to an exemplary embodiment of the present invention the at least one node corresponding to the abnormal application component may be present in each of the traversed plurality of paths.

Referring to FIG. 6, nodes 604 and 609 may each be identified as having a relatively long response time. Thus, nodes 604 and 609 may be identified as corresponding to an abnormal application component and may be included in the recommendation list for service or repair.

Figure 7:
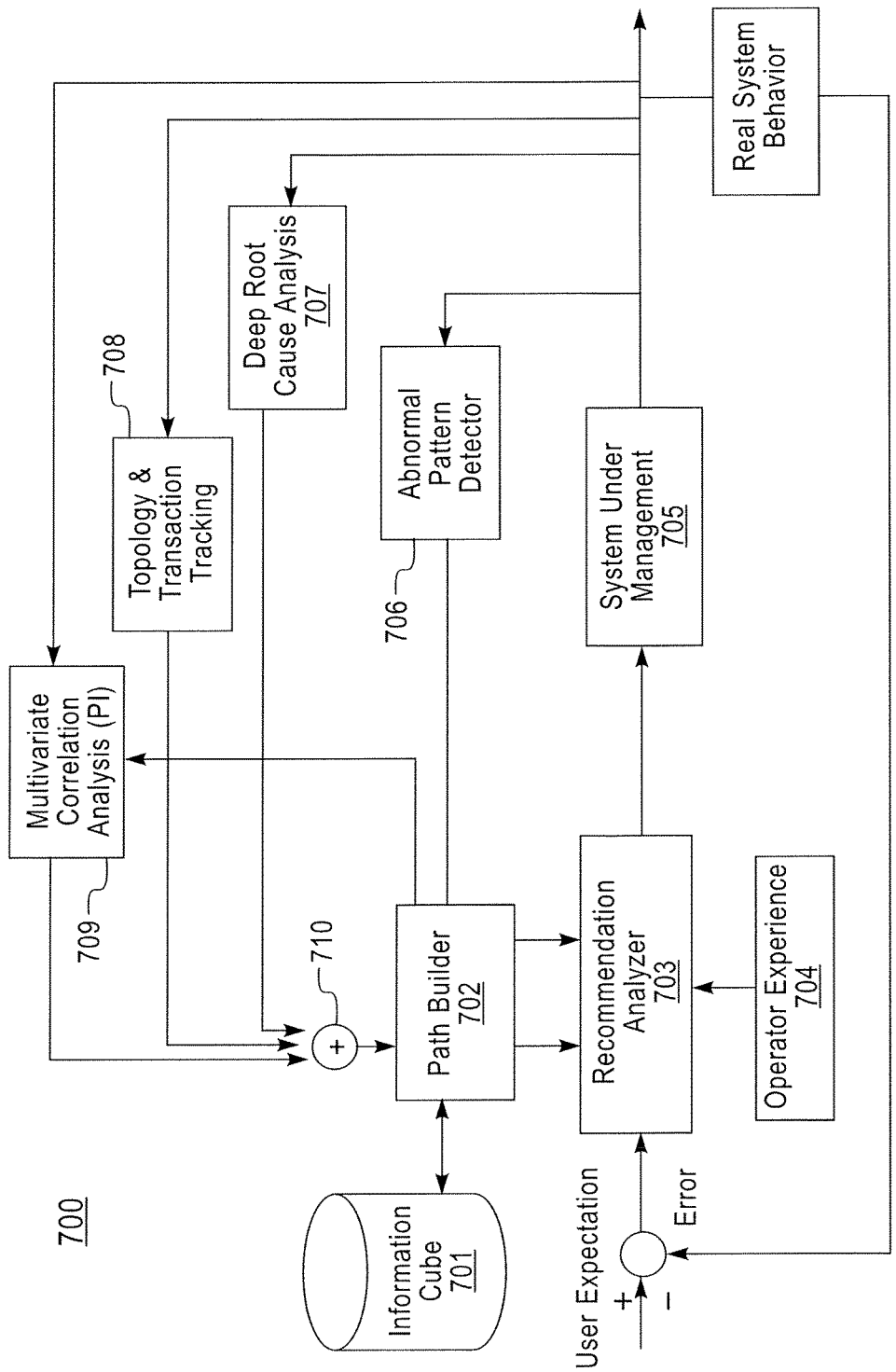
FIG. 7 is a schematic diagram illustrating root cause recommendation system architecture according to an exemplary embodiment of the present invention.

FIG. 7 is a schematic diagram illustrating root cause recommendation system architecture according to an exemplary embodiment of the present invention.

Referring to FIG. 7, a root cause recommendation system 700 may include an information cube 701, a path builder 702, a recommendation analyzer 703, a system under management 705, an abnormal pattern detector 706, a deep root cause analysis unit 707, a topology and transaction tracking unit 708, and a multivariate correlation analysis unit 709. The abnormal pattern detector 706, the topology and transaction tracking unit 708, and the multivariate correlation analysis unit 709 may perform abnormal pattern detection, topology and transaction data processing, and correlation analysis, respectively, as described above. The system under management 705 may be the distributed computing environment system illustrated, for example, in FIG. 2. Data from the abnormal pattern detector 706, the topology and transaction tracking unit 708, and the multivariate correlation analysis unit 709 may be combined 710, and may be provided to the path builder 702. The recommendation analyzer 703 may output a recommendation list to an operator 704.

According to an exemplary embodiment of the present invention, the path builder 702 may communicate with the information cube 701. The information cube 701 may store analytic and monitoring solutions. For example, the information cube 701 may store executable software for analysis and monitoring of the distributed computing environment, and the executable software may be utilized by the path builder 702. The monitoring and analysis solutions in the information cube 701 may capture workload and bottleneck dynamics of the components of the application including the distributed computing environment. Workload variations and an occurrence of bottlenecks in the application components may occur dynamically, and solutions for analyzing and monitoring the workload and bottlenecks may be learned and stored in the information cube 701. For example, predictive insight (PI) of the multivariate correlation analysis unit 709 may be increased by learning relationships between the application components and the timing of communication between the application components.

The recommendation analyzer 703 may generate a recommendation list (see, e.g., FIG. 11) based on data generated by traversing the graph built by the path builder 702 and may provide the recommendation list to an operator 704. The recommendation analyzer 703 may further analyze the recommendation list and present a prioritized recommendation list the user 704. For example, nodes which are identified as most likely abnormal may be presented to the user first by the recommendation analyzer 703. Abnormal or potentially abnormal nodes appearing on the recommendation list may be identified and/or prioritized based on confidence scores (see, e.g., FIG. 11).

The deep root cause analysis unit 707 may identify the root cause of performance degradation in the distributed computing environment. For example, the root cause of performance degradation may include a database deadlock, running out of JVM memory or running out of a database connection pool. Thus, an individual server may be identified as not functioning as desired. The root cause identified by the deep root cause analysis unit 707 may be correlated with the degradation of throughput and/or response time to determine causality in the edges between individual servers. The deep root cause analysis unit 707 may perform dynamic code path analytics. The deep root cause analysis unit 707 may determine a particular line of code which is causing degradation in a CPU or IO consumer. However, exemplary embodiments of the present invention are not limited thereto and any desired root cause analysis tools may be utilized, as desired.

The phrase "real system behavior" may refer to the average throughput and average response time that are measured for a particular application or system.

Figure 8:
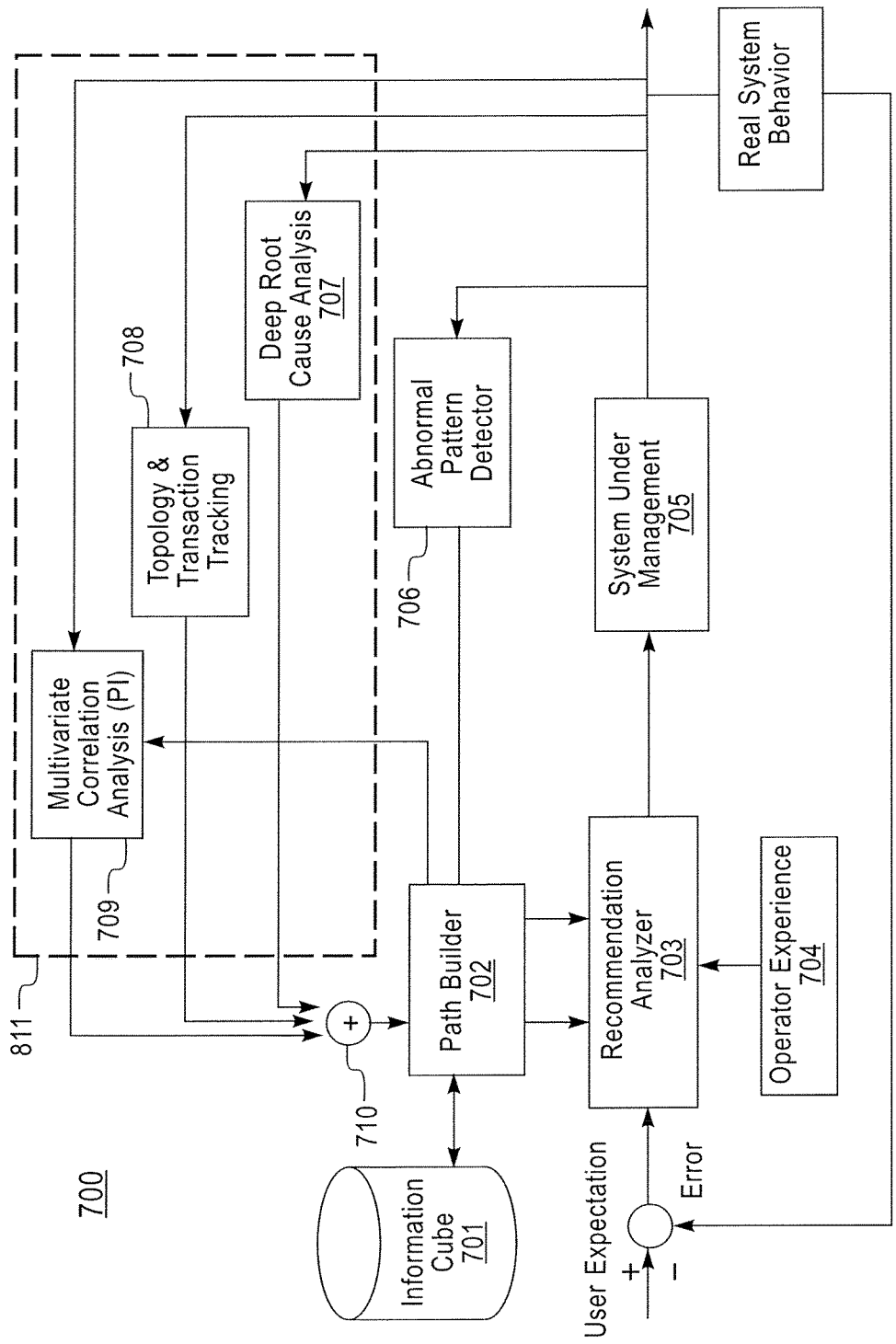
FIG. 8 is a schematic diagram illustrating system architecture including an analytic monitoring system according to an exemplary embodiment of the present invention.

FIG. 8 is a schematic diagram illustrating system architecture including an analytic monitoring system according to an exemplary embodiment of the present invention.

Referring to FIG. 8, an analytic monitoring system 811 may include the multivariate correlation analysis unit 709, the topology and transaction tracking unit 708 and the deep root analysis unit 707. According to an exemplary embodiment of the present invention the presence of at least one abnormal application component may be detected by the analytic monitoring system 811. The at least one abnormal application component may function as a system bottleneck.

FIGS. 9A-9D are graphs of exemplary response time data according to exemplary embodiments of the present invention.

Figure 9A:
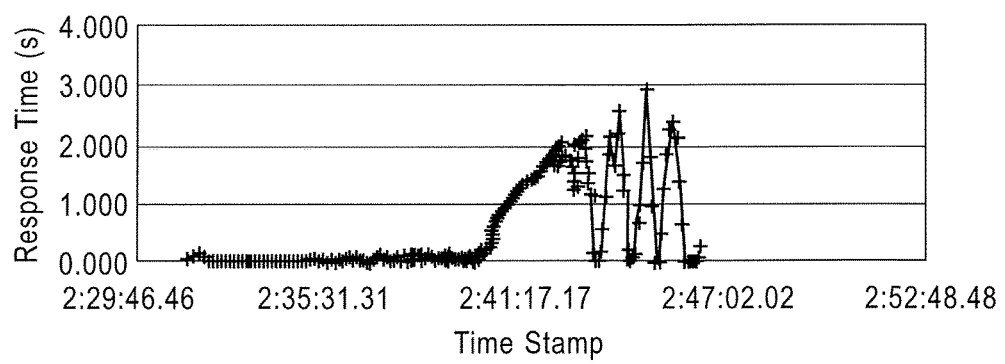
FIGS. 9A-9D are graphs of exemplary response time data according to exemplary embodiments of the present invention.
Figure 9B:
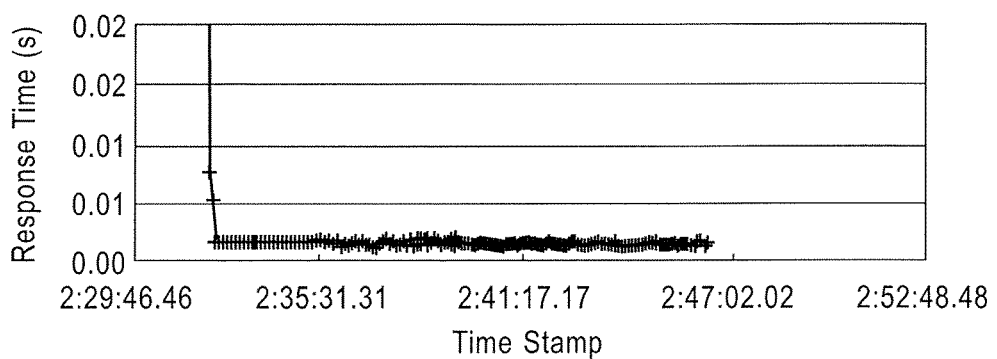
Figure 9C:
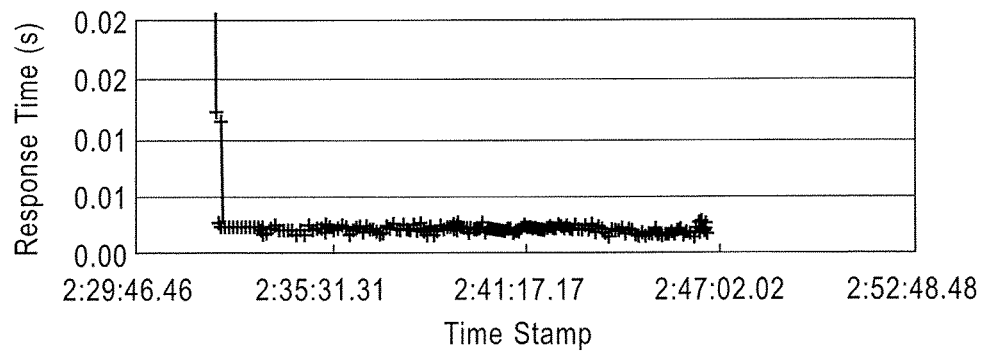
Figure 9D:
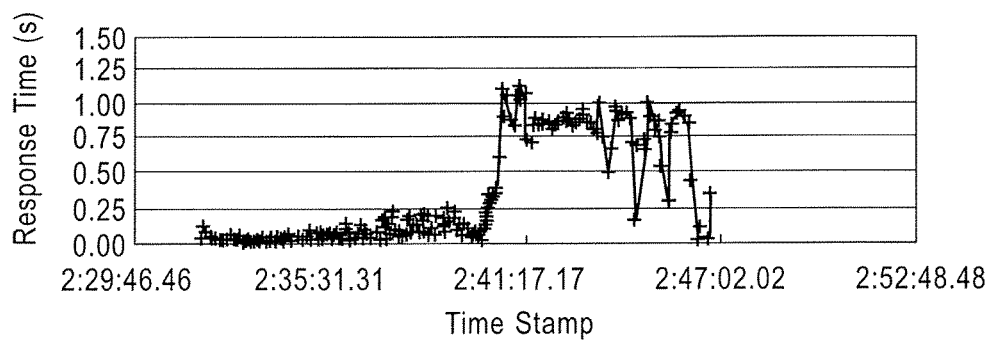

Referring to FIG. 9A, FIG. 9B, FIG. 9C and FIG. 9D, response times for exemplary nodes are illustrated. The response times are illustrated at a number of time stamps. As illustrated, a number of data points may be presented, and each data point may illustrate a response time determined for a particular node at each time point. As illustrated in FIG. 9A and FIG. 9D, a number of relatively long response times may be determined for a particular node. The relatively long response times may indicate an abnormality in the observed node. As illustrated in FIG. 9B and FIG. 9C, response times for a particular node may consistently be relatively short. The relatively short response times may indicate that there is not an abnormality in the observed node.

Figure 10:
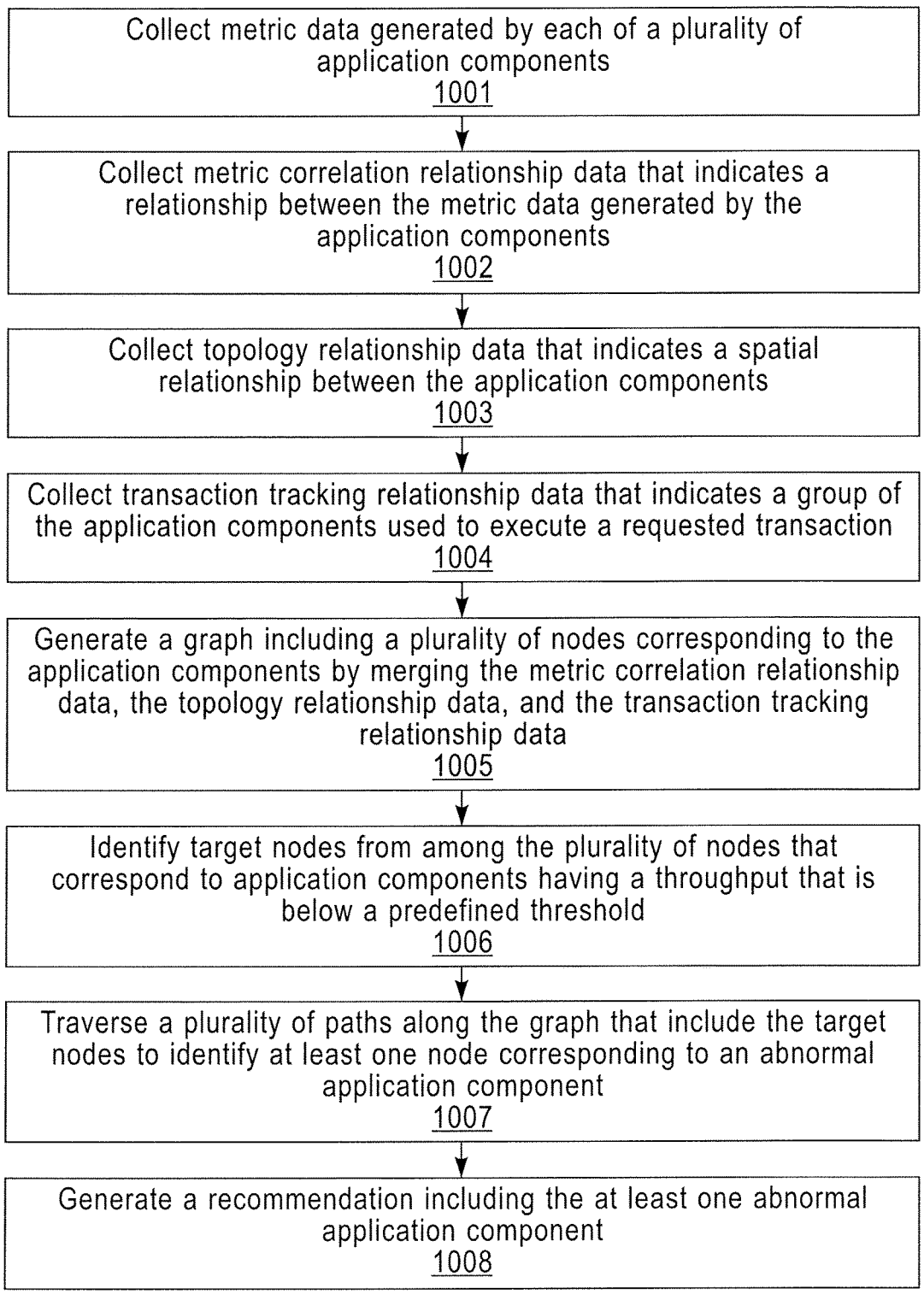
FIG. 10 is a flow chart of a method of relationship based root cause recommendation according to exemplary embodiments of the present invention.

FIG. 10 is a flow chart of a method of relationship based root cause recommendation according to exemplary embodiments of the present invention.

Exemplary embodiments of the present invention provide a method of identifying a root cause in a distributed computing environment. Referring to FIG. 10, the method of identifying a root cause in a distributed computing environment may include collecting metric data generated by each of a plurality of application components 1001, collecting metric correlation relationship data that indicates a relationship between the metric data generated by the application components 1002, collecting topology relationship data that indicates a spatial relationship between the application components 1003, and collecting transaction tracking relationship data that indicates a group of the application components used to execute a requested transaction 1004. A graph may be generated including a plurality of nodes corresponding to the application components by merging the metric correlation relationship data, the topology relationship data, and the transaction tracking relationship data 1005. Target nodes may be identified among the plurality of nodes that correspond to application components having a throughput that is below a predefined threshold 1006. A plurality of paths along the graph that include the target nodes may be traversed to identify at least one node corresponding to an abnormal application component 1007. A recommendation list may be generated including the at least one abnormal application component 1008.

Figure 11:
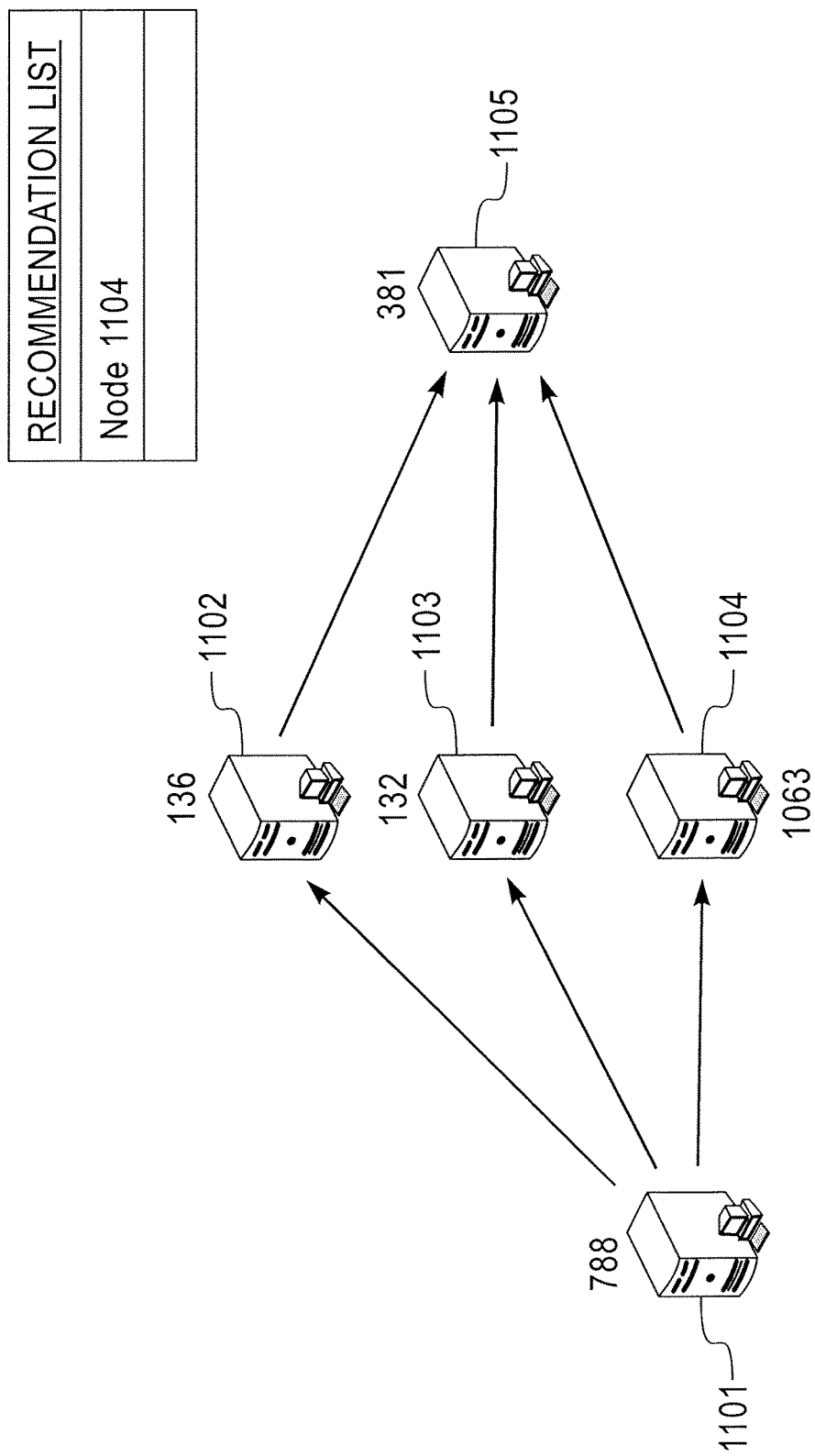
FIG. 11 illustrates exemplary confidence scores for a plurality of identified target nodes and an exemplary recommendation list corresponding to the plurality of identified target nodes according to exemplary embodiments of the present invention.

FIG. 11 illustrates exemplary confidence scores for a plurality of identified target nodes and an exemplary recommendation list corresponding to the plurality of identified target nodes according to exemplary embodiments of the present invention.

Referring to FIG. 11, the graph described in more detail above may be generated for the plurality of target nodes (e.g., nodes 1101, 1102, 1103, 1104 and 1105). Each of the target nodes may be traversed to identify response times, latency, throughput and/or error counts and confidence scores may be determined for each of the nodes. A higher confidence score may indicate a higher likelihood that a particular node includes an error. The confidence scores may be used to identify a potentially abnormal node and the recommendation list may be generated. For example, as illustrated in FIG. 11, node 1104 may have a relatively high confidence score and node 1104 may be included in the recommendation list. Thus, node 1104 may be targeted for repair or maintenance.

Figure 12:
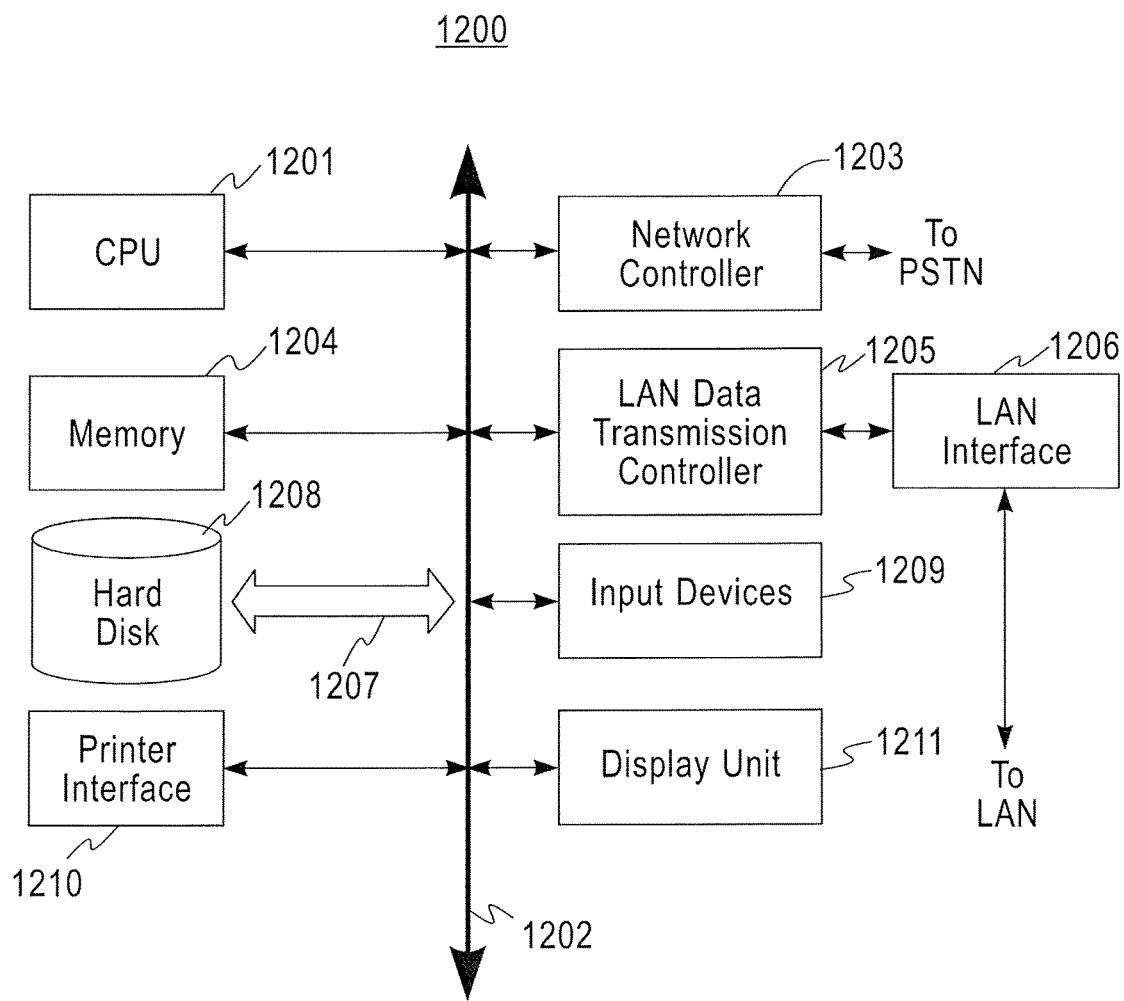
FIG. 12 illustrates an example of a computer system capable of implementing the method according to exemplary embodiments of the present invention.

FIG. 12 illustrates an example of a computer system capable of implementing the methods according to exemplary embodiments of the present invention. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1200 may include, for example, a central processing unit (CPU) 1201, random access memory (RAM) 1204, a printer interface 1210, a display unit 1211, a local area network (LAN) data transmission controller 1205, a LAN interface 1206, a network controller 1203, an internal bus 1202, and one or more input devices 1209, for example, a keyboard, mouse etc. As shown, the system 1200 may be connected to a data storage device, for example, a hard disk, 1208 via a link 1207.

FIG. 13 illustrates an exemplary root cause scores for exemplary nodes in a distributed computing environment and exemplary weights for exemplary edges in the distributed computing environment according to an exemplary embodiment of the present invention.

Referring to FIG. 13, a distributed computing environment may include a plurality of servers or computers (e.g., servers 1301, 1302, 1303, 1304, 1305 and 1306). According to exemplary embodiments of the present invention, each of the plurality of servers (e.g., servers 1301, 1302, 1303, 1304, 1305 and 1306) may be linked with or may communicate with at least one other server. The links or connections between servers may be referred to as edges. A confidence score or weight may be calculated for each edge. Communication between servers may be bidirectional, and weights may be determined in either direction of communication (e.g., between serve 1301 and downstream server 1302, or between server 1302 and downstream server 1301). The weight may be determined according to the response time, latency or a rate of occurrence of abnormal events detected in a particular edge compared with the end user response time or the response time for the entire application. The response time, latency or rate of occurrence of abnormal events for each of the servers may be an indication of how likely a particular server contains an abnormality or is not functioning as desired.

Root cause scores may be determined for each of the nodes. A higher root cause score may indicate a higher likelihood that a particular node includes an error. The root cause scores may be used to identify a potentially abnormal node and the recommendation list may be generated. For example, as illustrated in FIG. 16, node 1304 may have a relatively high root cause score and node 1304 may be included in the recommendation list. Thus, node 1304 may be targeted for repair or maintenance. Thus, bidirectional weights may be determined for each edge between each pair of neighboring serves, and the relative weights of each edge may be used to determine a root cause score for each server, node or component.

The descriptions of the various exemplary embodiments of the present invention have been presented for purposes of illustration, but are not intended to be exhaustive or limited to the exemplary embodiments disclosed. Many modifications and variations will be apparent to those of ordinary skill in the art without departing from the scope and spirit of the described exemplary embodiments. The terminology used herein was chosen to best explain the principles of the exemplary embodiments, or to enable others of ordinary skill in the art to understand exemplary embodiments described herein.

The flowcharts and/or block diagrams in the figures illustrate the architecture, functionality, and operation of possible implementations of systems, methods, and computer program products according to various exemplary embodiments of the inventive concept. In this regard, each block in the flowchart or block diagrams may represent a module, segment, or portion of instructions, which comprises one or more executable instructions for implementing the specified logical function(s). In alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood that although this disclosure relates to cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A method of identifying a root cause in a distributed computing environment, comprising:
    collecting metric data generated by each of a plurality of application components;
    collecting metric correlation relationship data that indicates a relationship between the metric data generated by the application components;
    collecting physical topology relationship data that indicates a spatial relationship between the application components;
    collecting transaction tracking relationship data that indicates a group of the application components used to execute a requested transaction;
    generating a graph including a plurality of nodes corresponding to the application components by merging the metric correlation relationship data, the physical topology relationship data, and the transaction tracking relationship data;
    calculating a bi-directional weight for each of a plurality of edges connecting neighboring nodes among the plurality of nodes based on a rate of occurrence of abnormal events detected between pairs of neighboring nodes among the plurality of nodes;
    traversing the plurality of nodes in the graph in an order based on the bi-directional weight for each of the plurality of edges connecting neighboring nodes among the plurality of nodes;
    identifying target nodes from among the plurality of nodes that correspond to application components having a response time that is above a predefined threshold;
    traversing a plurality of paths along the graph that include the target nodes to identify at least one node corresponding to an abnormal application component; and
    generating a recommendation including the at least one abnormal application component, wherein the recommendation includes an instruction to repair the at least one abnormal application component, and wherein the at least one abnormal application component acts as a system bottleneck in the distributed computing environment,
    wherein the application components are a plurality of computers in the distributed computing environment, and
    wherein at least some of the plurality of computers represented in the physical topology relationship data are communicatively coupled to perform the requested transaction.

2. The method of claim 1, wherein the at least one node corresponding to the abnormal application component is present in each of the traversed plurality of paths.

3. The method of claim 1, wherein the metric data comprises at least one of a response time, a throughput, a latency, and an error count.

4. The method of claim 1, wherein the physical topology relationship data further indicates a traversed path along the group of the application components taken to execute the requested transaction.

5. The method of claim 4, wherein the group of the application components used to execute the requested transaction includes some of the application components.

6. The method of claim 4, wherein the group of the application components used to execute the requested transaction includes all of the application components.

7. A method of identifying a root cause in a distributed computing environment, comprising:
    collecting metric data generated by each of a plurality of application components;
    collecting metric correlation relationship data that indicates a relationship between the metric data generated by the application components;
    collecting physical topology relationship data that indicates a spatial relationship between the application components;
    collecting transaction tracking relationship data that indicates a group of the application components used to execute a requested transaction;
    generating a graph including a plurality of nodes corresponding to the application components by merging the metric correlation relationship data, the physical topology relationship data, and the transaction tracking relationship data;
    calculating a bi-directional weight for each of a plurality of edges connecting neighboring nodes among the plurality of nodes based on a rate of occurrence of abnormal events detected between pairs of neighboring nodes among the plurality of nodes;
    traversing the plurality of nodes in the graph in an order based on the bi-directional weight for each of the plurality of edges connecting neighboring nodes among the plurality of nodes;
    identifying target nodes from among the plurality of nodes that correspond to application components having a throughput that is below a predefined threshold;
    traversing a plurality of paths along the graph that include the target nodes to identify at least one node corresponding to an abnormal application component; and
    generating a recommendation including the at least one abnormal application component, wherein the at least one abnormal application component acts as a system bottleneck in the distributed computing environment,
    wherein the application components are a plurality of computers in the distributed computing environment, and
    wherein at least some of the plurality of computers represented in the physical topology relationship data are communicatively coupled to perform the requested transaction.

8. The method of claim 7, wherein the at least one node corresponding to the abnormal application component is present in each of the traversed plurality of paths.

9. The method of claim 7, wherein the metric data comprises at least one of a response time, a throughput, a latency, and an error count.

10. The method of claim 7, wherein the physical topology relationship data further indicates a traversed path along the group of the application components taken to execute the requested transaction.

11. The method of claim 10, wherein the group of the application components used to execute the requested transaction includes some of the application components.

12. The method of claim 10, wherein the group of the application components used to execute the requested transaction includes all of the application components.

13. A computer system configured to identify a root cause in a distributed computing environment, the system comprising:
   a memory storing a computer program; and
   a processor configured to execute the computer program, wherein the computer program is configured to:
      collect metric data generated by each of a plurality of application components;
      collect metric correlation relationship data that indicates a relationship between the metric data generated by the application components;
      collect physical topology relationship data that indicates a spatial relationship between the application components;
      collect transaction tracking relationship data that indicates a group of the application components used to execute a requested transaction;
      generate a graph including a plurality anodes corresponding to the application components by merging the metric correlation relationship data, the physical topology relationship data, and the transaction tracking relationship data;
      calculate a bi-directional weight for each of a plurality of edges connecting neighboring nodes among the plurality of nodes based on a rate of occurrence of abnormal events detected between pairs of neighboring nodes among the plurality of nodes;
      traverse the plurality of nodes in the graph in an order based on the bi-directional weight for each of the plurality of edges connecting neighboring nodes among the plurality of nodes;
      identify target nodes from among the plurality of nodes that correspond to application components having a response time that is above a predefined threshold;
      traverse a plurality of paths along the graph that include the target nodes to identify at least one node corresponding to an abnormal application component; and
      generate a recommendation including the at least one abnormal application component, Wherein the recommendation includes an instruction to repair the at least one abnormal application component, and Wherein the at least one abnormal application component acts as a system bottleneck in the distributed computing environment,
   wherein the application components are a plurality of computers in the distributed computing environment, and
   wherein at least some of the plurality of computers represented in the physical topology relationship data are communicatively coupled to perform the requested transaction.

14. The computer system of claim 13, Wherein the at least one node corresponding to the abnormal application component is present in each of the traversed plurality of paths.

15. The computer system of claim 13, wherein the metric data comprises at least one of a response time, a throughput, a latency, and an error count.

* * * * *